Figure 1:
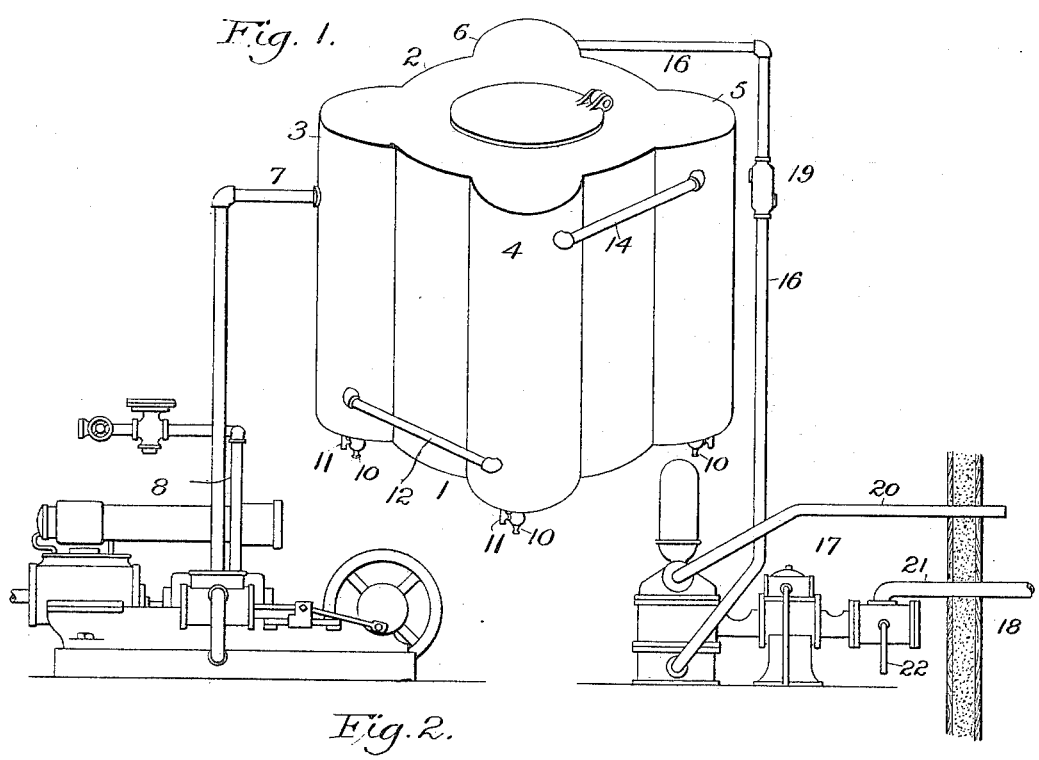

No. 640,318. Patented Jan. 2, 1900.
A. T. PERKINS.
APPARATUS FOR DRYING AIR.
(Application filed Oct. 13, 1896. Renewed Nov. 21, 1899.)

(No Model.) 2 Sheets—Sheet 1.

WITNESSES
James T. Duhamel
J. C. Tappan

INVENTOR
Alfred T. Perkins
by John Wedderburn
Attorney

THE NORRIS PETERS CO., PHOTO-LITHO., WASHINGTON, D. C.

No. 640,318. Patented Jan. 2, 1900.
A. T. PERKINS.
APPARATUS FOR DRYING AIR.
(Application filed Oct. 13, 1896. Renewed Nov. 21, 1899.)
(No Model.) 2 Sheets—Sheet 2.
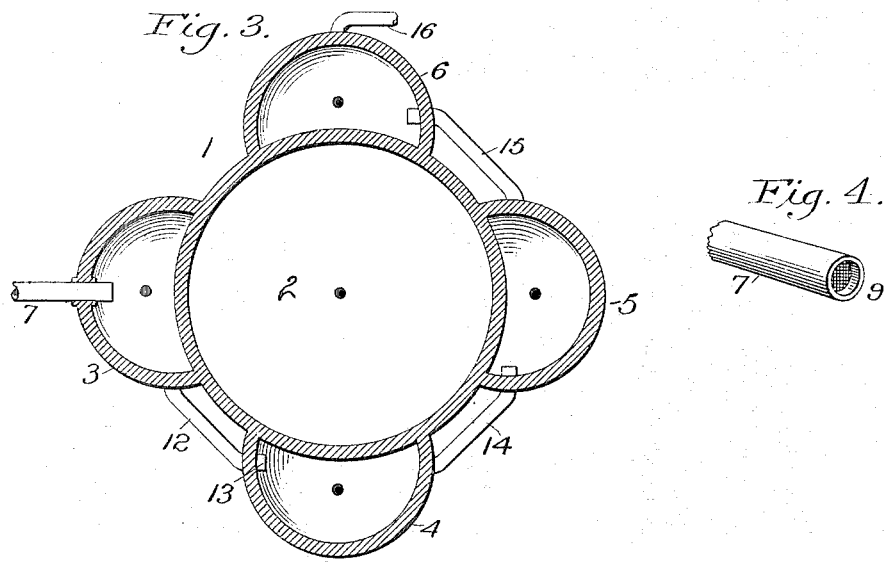
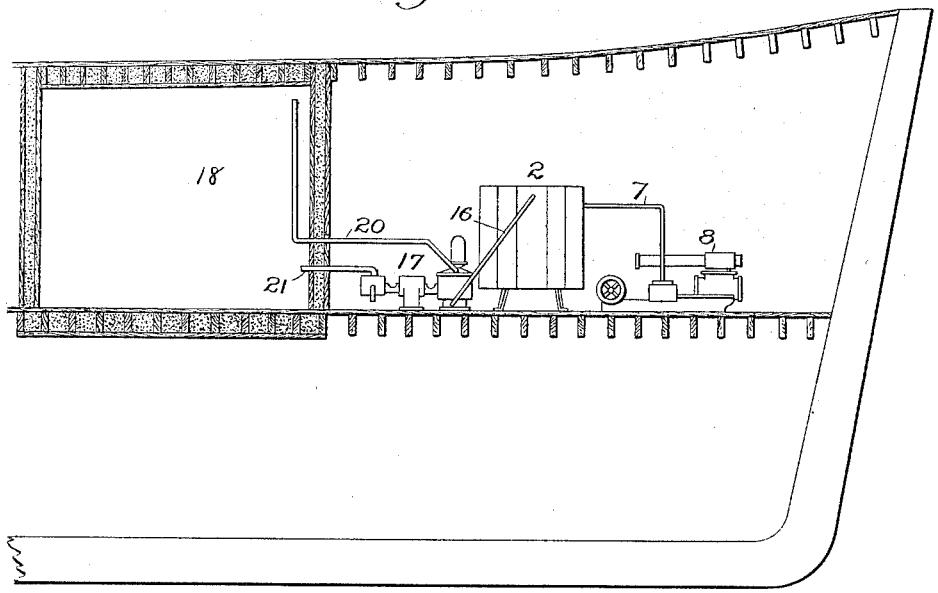
WITNESSES
James F. Duhamel
J. C. Tappan
INVENTOR
Alfred T. Perkins
By John Wedderburn
Attorney

UNITED STATES PATENT OFFICE.

ALFRED T. PERKINS, OF CHICAGO, ILLINOIS.

APPARATUS FOR DRYING AIR.

SPECIFICATION forming part of Letters Patent No. 640,318, dated January 2, 1900.

Application filed October 13, 1896. Renewed November 21, 1899. Serial No. 737,820. (No model.)

*To all whom it may concern:*

Be it known that I, ALFRED T. PERKINS, a citizen of the United States, residing at Chicago, in the county of Cook and State of Illinois, have invented certain new and useful Improvements in Apparatus for Drying Air; and I do hereby declare the following to be a full, clear, and exact description of the invention, such as will enable others skilled in the art to which it appertains to make and use the same.

On April 14, 1896, I filed an application for patent in the United States Patent Office, Serial No. 587,526, for an improved process for the conservation of fruits and other perishable products, and on June 24, 1896, I filed another application, Serial No. 596,670, for improvements in fruit-cars or apparatus to be used upon fruit-cars for carrying out the process described in the former application. The process therein set forth for the conservation of fruit is not what is known as "the process of refrigeration," but utilizes instead of a closed chamber with moist air at a low temperature a continuous current of dry air at a normal temperature. The action is based upon the prime factors of decay, which in fruit are a given percentage of sugar and acid with a known degree of temperature and humidity, and in connection with these a vitalizing of the fungoid spores. In illustration, the development of decay in fruits of fine tender flesh, as the peach and the apricot, is the action of the sugar and acids in fermentation, causing the exudation of moisure to the surface. Under a high temperature this is rapid, especially if the atmosphere is humid. This exudation is essential to the vitalization of the spores, and in fruits carrying a high percentage of sugar is correspondingly viscid, catching and spreading the floating spores in the atmosphere. The recognized opinion of the best authorities at the present time is that the proper conservation of fruit requires a process which will produce the proper temperature to retard fermentation, a dry air to absorb the moisture, and a sterilized air to destroy the germs of fungoid growth, at least to devitalize those which have formed the union of the hyphæ, and to thereby sift and destroy the fruit-spores. The process of refrigeration reduces the air to a low temperature, either by ice or chemicals, with a large degree of humidity, and with the fruit or meats sealed in a tight chamber meets only a portion of the factors of decay. Under that system the germs of the mycelium will vitalize and spread their seeds with more or less rapidity even at a low temperature. The carbonic-acid gas which is continuously exuded from the body of fruit in a sealed chamber if confined therein will ultimately destroy the flavor, though the fruit itself may not decay. The germs once vitalized even at a low temperature are a source of danger and disease, injurious to the weak stomachs of children and invalids eating such fruit without removing the skin. A dry-sterilized-air process obviates all these faults and conserves the fruit in perfect condition for a longer period of time than refrigeration. In the process described in my application Serial No. 587,526 these steps have been clearly set forth, and in the application Serial No. 597,670, for apparatus for carrying out this process, means have been illustrated and described for sterilizing air by subjecting it to a high degree of heat and for afterward drying the same and supplying it to the chamber containing the fruit under a high pressure. The apparatus described in the last-mentioned application has been found to be extremely effective when used on railway-cars for the transportation of fruit or other perishable products a short distance—say from three to six days. When, however, the fruit is to be carried longer distances, as is the case when transported by steamer over distances requiring from fifteen to thirty days to travel, it has been found that a process and apparatus which will completely remove the moisture contained in the air are required.

The object of my present invention is to provide an improved apparatus for drying air, especially adapted to be employed upon steamships and sailing vessels.

Before entering into a detailed description of this invention, however, it should be stated that warm air will retain in suspension a much greater amount of moisture than air at a lower temperature. Also that by reason of the fact that in utilizing my apparatus and in carrying out my process the air is subjected to high degrees of pressure, which increases the temperature of the same and consequently increases its moisture-suspending properties, means must be provided for successively cooling the air after each compression, and, finally, supplying it at the proper temperature and in a perfectly dry condition to the compartment or chamber in which the fruit is placed.

My improved process consists in subjecting air under pressure and in a finely-divided condition to the successive action of a series of chilled surfaces in separate and independent inclosed spaces. The apparatus for carrying out this process consists of a cooling-battery made up of a cylindrical chamber for containing ice or other cooling agent, a plurality of separate and independent closed air-receptacles secured to said cooling-chamber, connections between the final air-compressor of the series with one of said air-receptacles, connections between each adjacent pair of air-receptacles arranged alternately at the upper and lower ends thereof, drip-pipes at the lower ends of each of said air-receptacles with cocks or cut-offs therein, a pipe leading from the final air-receptacle of the battery to a double-acting pump which is adapted to force the air under pressure from the battery into the fruit-compartment and to draw the waste air and moisture therefrom to discharge the same into the atmosphere, and a differential valve so constructed that it is adapted to open at one pressure, to close at another, and to remain open at any pressure between those at which it is adapted to open and close.

Figure 2:
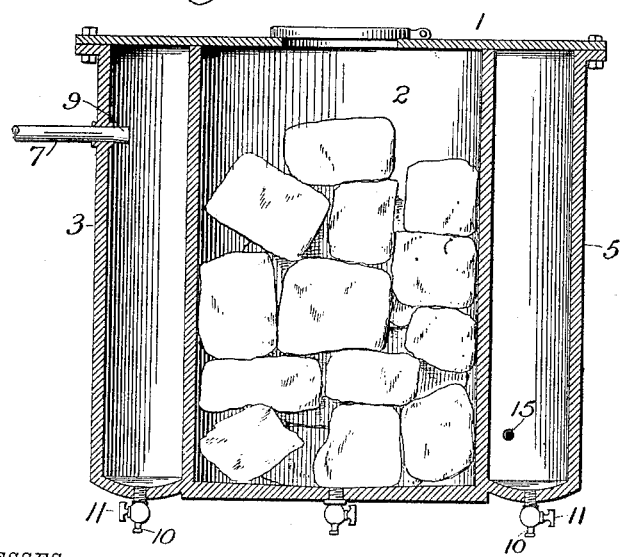

In the drawings forming part of this specification, Figure 1 represents a perspective view of my improved cooling-battery with the connections between it and the air-compressor shown diagrammatically. Fig. 2 is a vertical longitudinal section through the same. Fig. 3 is a horizontal section. Fig. 4 is an enlarged perspective detail view of one of the pipes entering the air-receptacles of the battery, showing the spraying-screen therein. Fig. 5 is an interior view showing the application of my invention to a vessel, bringing out particularly the connection between the battery, the double-acting pump, and the fruit-compartment.

Like reference-numerals indicate like parts in the different views.

The battery 1 is made up of a cylindrical chamber 2 for containing ice or other cooling agent and a plurality of air-receptacles 3 4 5 6, secured to or formed integral with the chamber 2 and located upon the outside thereof. The said air-receptacles are lune-shaped in cross-section, and their inner sides are formed by the outer sides of the chamber 2. Leading into the receptacle 3 is a pipe 7, which conducts air under pressure from a compressor 8, which is preferably the last of the series of compressors which are employed by me. In the pipe 7, near its point of entrance into the receptacle 3, is a screen 9 of very fine mesh, provided for the purpose of spraying the air admitted into said receptacle into very fine particles against the outer surface of the cooling-chamber 2. Each of the air-receptacles 3, 4, 5, and 6 has a tapering or rounded lower end, in which is located a drip-pipe 10, with a cock or cut-off 11 therein. The pipe 7 enters the receptacle 3 at a point near its upper end. Leading from the lower end of the receptacle 3 is a pipe 12, which enters the receptacle 4 at a point near its lower end, and is also formed with a fine screen 13 therein similar to the screen 9. Similar connections 14 and 15 are provided between the air-receptacles 4 and 5 and 5 and 6, the said connections being alternately arranged at the upper and lower ends of said receptacles. Leading from the final air-receptacle 6 is a pipe 16, which conveys the dry air under pressure from the battery to the double-acting pump 17, located just outside of the compartment 18 for containing the fruit. In the pipe 16 is located a differential valve 19, which is so constructed that it is adapted to open at one pressure, to close at a lower pressure, and to remain open at all pressures between those at which it is set to open and close. This valve forms the subject-matter for a separate application for patent and need not be described in detail herein. The pump 17 receives the air from the battery at one end and forces it through the pipe 20 into the fruit-compartment 18. It also receives the moist waste air from said compartment through the pipe 21 at its opposite end and forces it out into the atmosphere through the pipe 22.

My apparatus has now been sufficiently described, it is thought, to enable the operation thereof to be readily understood. I may preface the description thereof, however, with the statement that in actual practice the air is first sterilized by subjecting it to a high degree of heat, and it is then subjected to a pressure aggregating about five hundred pounds to the square inch. This is done, as heretofore stated, by a series of compressors, and the heat generated by the compression is reduced by what I term "intercoolers," so that when it leaves the final compressor it is at a temperature of about 110° Fahrenheit. When in this condition, the air contains a quantity of moisture, and it is fed through the pipe 7 into the first air-receptacle 3 of the battery, being first broken up into a spray or into fine streams by means of the screen 9. As it enters the receptacle 3 it is brought into contact with the cool outer surface of the cylindrical chamber 2, and by reason of the sudden reduction in the temperature a large part of the moisture contained in the air is precipitated and falls to the bottom of the receptacle 3. It then passes through the pipe 12 into the air-receptacle 4, being again divided up in its passage therethrough by the screen 13. Entering the receptacle 4, it is again brought in contact with the fresh cool surface of the cylindrical chamber 2 and more of the moisture contained therein is precipitated. This action being repeated by its passage through the remaining receptacles 5 and 6, it finally leaves the receptacle 6 in a perfectly dry condition. Actual experiment has shown that after operating this battery for a short time the receptacle 3 will be found to contain quite a large quantity of water in the bottom thereof, that the receptacle 4 will contain a smaller quantity, that the receptacle 5 will contain practically none, and that the receptacle 6 will contain absolutely none. The moisture in the receptacles may be removed, however, by opening cocks or cut-offs 11 in the pipes 10 and blowing it off after the manner of blowing out steam-boilers. The air leaving the receptacle 6 passes through the pipe 16 to the double-acting pump 17. It is then subjected to an additional and final compression and forced into the fruit-compartment 18 at normal temperature and in a perfectly dry condition, thereby removing all the moisture which may be upon the outside of the fruit, and thereby preventing the vitalization of the fungoid spores. The waste or moist air from the fruit-compartment 18 is drawn off by the pump 17 through the pipe 21 and discharged into the atmosphere through the pipe 22.

In actual practice it has been found that the amount of air supplied from the compressors to the cooling-battery and double-acting pump is not sufficient for a continuous current to be passed through the fruit-compartment under its initial pressure. I have therefore found it necessary to employ the differential valve 19 in the pipe 16. This valve is so constructed that it will open under a pressure of fifty pounds and permit all air to pass through it under that or a greater pressure. Said valve is also so constructed that it will close when the pressure falls to twenty-five pounds to the square inch or less, so that when the supply becomes so small that the pressure falls to twenty-five pounds all air will be shut off from the double-acting pump 17 and permit the battery to recharge itself. When a pressure of fifty pounds has been reached, the valve will reopen and permit the passage of air to the pump.

Having now described my invention, what I claim as new, and desire to secure by Letters Patent, is—

1. A battery for cooling and drying air, consisting of a main chamber for containing ice, a series of independent closed air-spaces adjacent the periphery of the chamber and pipes connecting the air-spaces alternately at their tops and bottoms, substantially as and for the purpose described.

2. A battery for cooling air and for precipitating the moisture contained therein, consisting of a chamber for containing ice or other cooling agent, a series of closed air-receptacles communicating one with the other on the outside of said chamber, and means for admitting air to one of said receptacles, substantially as described.

3. A battery for cooling air and for precipitating the moisture contained therein, consisting of a chamber for containing ice or other cooling agent, a series of closed air-receptacles connected to said chamber, means for admitting air to one of said receptacles, and connections between the adjacent pairs of receptacles, substantially as described.

4. A battery for cooling air and for precipitating the moisture contained therein, consisting of a cylindrical chamber for containing ice or other cooling agent, a plurality of air-receptacles connected to the outside of said chamber, means for admitting air to one of said receptacles, and pipes connecting the adjacent pairs of receptacles arranged alternately at the upper and lower ends thereof, substantially as and for the purpose described.

5. A battery for cooling air and for precipitating the moisture contained therein, consisting of a cylindrical chamber for containing ice or other cooling agent, a plurality of air-receptacles connected to the outside of said chamber, means for admitting air in a finely-divided condition to one of said receptacles, and pipes connecting the adjacent pairs of receptacles arranged alternately at the upper and lower ends thereof, substantially as and for the purpose described.

6. A battery for cooling air and for precipitating the moisture contained therein, consisting of a cylindrical chamber for containing ice or other cooling agent, a plurality of closed air-receptacles secured to the outside of said chamber, means for admitting air to one of said receptacles, connections between the adjacent pairs of said receptacles, and valved drip-pipes in the lower ends of each of said receptacles for drawing off the water of condensation.

7. A battery for cooling air and for precipitating the moisture contained therein, consisting of a cylindrical chamber for containing ice or other cooling agent, a plurality of closed air-receptacles on the outside of said chamber, a supply-pipe for air entering one of said receptacles, a screen in said pipe for breaking up the air into fine particles and admitting it in the form of a spray into said receptacle, pipes connecting the adjacent pairs of said receptacles, and screens in said pipes, substantially as and for the purpose described.

8. A battery for cooling air and for precipitating the moisture contained therein, consisting of a cylindrical chamber for containing ice or other cooling agent, a plurality of closed air-receptacles on the outside of said chamber, a supply-pipe for air entering one of said receptacles, a screen in said pipe for breaking up the air into fine particles and admitting it in the form of a spray into said receptacle, pipes connecting the adjacent pairs of said receptacles arranged alternately at the upper and lower ends thereof, screens in said pipes, and valved drip-pipes in the lower ends of said receptacles for drawing off the water of condensation, substantially as and for the purpose described.

In testimony whereof I have signed this specification in the presence of two subscribing witnesses.

ALFRED T. PERKINS.

Witnesses:
WM. M. STOCKBRIDGE,
D. G. STUART.